(12) United States Patent
Glas et al.

(10) Patent No.: US 6,904,538 B2
(45) Date of Patent: Jun. 7, 2005

(54) SYSTEM AND METHOD FOR DIFFERENTIAL DATA DETECTION

(75) Inventors: Jack P. Glas, Basking Ridge, NJ (US); Vladimir I. Prodanov, New Providence, NJ (US)

(73) Assignee: Agere Systems Inc., Allentown, PA (US)

( * ) Notice: Subject to any disclaimer, the term of this patent is extended or adjusted under 35 U.S.C. 154(b) by 542 days.

(21) Appl. No.: 09/989,272

(22) Filed: Nov. 20, 2001

(65) Prior Publication Data

US 2003/0097601 A1 May 22, 2003

(51) Int. Cl.$^7$ ............................................. H04B 1/04
(52) U.S. Cl. .................... 713/401; 455/114.2; 455/110; 455/115.1; 375/298
(58) Field of Search ...................... 713/401; 455/114.2, 455/115.1, 110; 375/298

(56) References Cited

U.S. PATENT DOCUMENTS

| | | | | |
|---|---|---|---|---|
| 4,542,657 A | * | 9/1985 | Barber et al. ............. | 73/861.25 |
| 4,766,392 A | * | 8/1988 | Moore ....................... | 329/323 |
| 5,828,707 A | * | 10/1998 | Urabe et al. ................ | 375/330 |
| 6,127,884 A | * | 10/2000 | Rishi .......................... | 329/304 |
| 6,157,235 A | * | 12/2000 | Bautista et al. ............. | 327/254 |
| 6,373,903 B1 | * | 4/2002 | Wynn ......................... | 375/308 |
| 6,381,288 B1 | * | 4/2002 | He et al. ..................... | 375/330 |
| 6,674,790 B1 | * | 1/2004 | Rasmussen et al. ........ | 375/146 |
| 6,674,998 B2 | * | 1/2004 | Prentice .................... | 455/114.2 |

OTHER PUBLICATIONS

"Specification of the Bluetooth System", Specification vol. 1, Core, v1.0A, Jul. 26, 1999.
"A Differential FM Detector for Low–IF Radios", Jack P.F. Glas, Bell Labs, Lucent Technologies.
"Performance of Sequence Estimation Scheme of Narrow–band Digital FM Signals with Limiter–Discriminator Detection", Yasunori Iwanami, Member, IEEE, IEEE Journal On Selected Areas In Communications, vol. 13, No. 2, Feb. 1995.
"A Single–Chip 900 MHz CMOS Receiver Front–End with a High Performance Low–IF Topology", Jan Crols, Student Member, IEEE, and Michel S. J. Steyaert, Senior Member, IEEE, IEEE Journal Of Solid–State Circuits, vol. 30, No. 12, Dec. 1995.
"Performance Evaluation of Differential and Discriminator Detection of Continuous Phase Modulation", N. Arne B. Svensson, Member, IEEE, and Carl–Erik W. Sundberg, Senior Member, IEEE, IEEE Transactions On Vehicular Technology, vol. VT–35, No. 3, Aug. 1986.
"Differential Versus Limiter–Discriminator Detection of Narrow–Band FM", Marvin K. Simon, Fellow, IEEE, and Charles C. Wang, Student Member, IEEE, IEEE Transactions On Communications, vol. COM–31, No. 11, Nov. 1983.
"A BiCMOS Double–Low–IF Receiver for GSM", Mihai Banu, Hongmo Wang, Mark Seidel, Maurice Tarsia, William Fischer, Jack Glas, Alex Dec, Vito Boccuzzi, Bell Laboratories, Lucent Technologies, Murray Hill, NJ 07974, IEEE 1997 Custom Integrated Circuits Conference.

\* cited by examiner

*Primary Examiner*—A. Elamin

(57) ABSTRACT

The present invention is directed towards a data detector for deriving a data signal from an incoming radio frequency input. The data detector comprises a delay logic which receives an unfiltered signal in quadrature and in-phase components, and applies a delay to each of the in-phase and quadrature phase components of the unfiltered input signal. The detector further comprises a first multiplication logic that multiplies the delayed in-phase component of the unfiltered signal by the quadrature phase component of the unfiltered signal to obtain a first result, and a second multiplication logic that multiplies the delayed quadrature phase component of the unfiltered signal by the in-phase component of the unfiltered signal to obtain a second result. Finally, an adder adds the first result with the second result to generate a data signal. In alternative embodiments a post detection correction algorithm may be added to improve performance.

36 Claims, 4 Drawing Sheets

SYSTEM AND METHOD FOR DIFFERENTIAL DATA DETECTION

TECHNICAL FIELD OF THE INVENTION

The present invention is generally related to radio receivers and, more particularly to a system and method for data detection in an angular modulation environment at a low intermediate frequency.

BACKGROUND OF THE INVENTION

Technology has seen an unprecedented ramp-up over the past several years. In our new technological world, the systems that support the technology have become increasingly complex, and the world has become wired. The Bluetooth wireless local area network operates to eliminate those wires.

The Bluetooth wireless LAN system has been in existence for a number of years now, but it is just beginning to garner a great deal of attention from the corporate world. The wireless LAN system as implemented allows everyday devices to communicate with each other on "scatternets." In brief, a scatternet is a sort of amorphous network. The devices connected to the network constantly change because of their mobile nature, and the mobile nature of the network itself. Each network device has the capability to be either a master or a slave, and sometimes both at the same time.

The network devices communicate with each other via a radio frequency (RF) connection. First generation Bluetooth devices use a spread spectrum frequency hopping (SSFH) technique in the 2.4 GHz, Industrial, Scientific, and Medical (ISM) frequency range. This supports a data transfer rate of around 1 Mbps. Further, the frequency hopping nature of the network also makes it difficult to intercept the transmissions, because the transmission frequency is constantly hopping in accordance with a hopping sequence known to both of the network devices and set based on the clock signal of the master device.

As such, the radio transmitters and receivers of these devices need to be very complex. The receiver comprises both a radio portion and a data detection portion. Data detection comes in many different forms. However, most of the existing data detection methods create problems in terms of either power consumption and/or cost efficiency. It is to that end that the present invention is aimed, i.e. performing data detection in a way that reduces power consumption requirements and that is cost efficient.

SUMMARY OF THE INVENTION

The invention involves a data detector, for generating a data signal from a radio frequency input signal stream. The data detector comprises delay logic, first multiplication logic, second multiplication logic and an adder. The delay logic receives an unfiltered input signal having quadrature and in-phase components, and applies a delay to each of the in-phase and quadrature phase components of the unfiltered input signal. The first multiplication logic then multiplies the delayed in-phase component of the unfiltered input signal by the quadrature phase component of the unfiltered input signal to obtain a first multiplication result. The second multiplication logic multiplies the delayed quadrature phase component of the unfiltered input signal by the in-phase component of the unfiltered input signal to obtain a second multiplication result. Finally, an adder adds the first multiplication result with the second multiplication result and generates a decision signal.

Another embodiment of the delay logic of the data detector receives an input signal in quadrature and in-phase components, and applies a delay to each of the in-phase and quadrature phase components of the input signal, wherein the delay is adjustable, allowing for frequency offset compensation. Then, the first multiplication logic multiplies the delayed in-phase component of the input signal by the quadrature phase component of the input signal to obtain a first multiplication result, and a second multiplication logic multiplies the delayed quadrature phase component of the input signal being by the in-phase component of the input signal to obtain a second multiplication result. Finally, an adder adds the first multiplication result with the second multiplication result to generate a decision signal.

The invention also comprises a method for detecting data in a radio frequency signal stream. An unfiltered input signal having an in-phase component and a quadrature phase component is received, and the in-phase and quadrature phase components of the input signal are delayed. Then, the in-phase component of the input signal is multiplied by the delayed quadrature phase component of the input signal to yield a first multiplication result. The delayed in-phase component of the input signal is multiplied by the quadrature phase component of the input signal to yield a second multiplication result. Finally, the first and second results are summed to generate a decision signal, which represents a data stream.

These and other features and advantages of the present invention will become apparent from the following description, drawings and claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
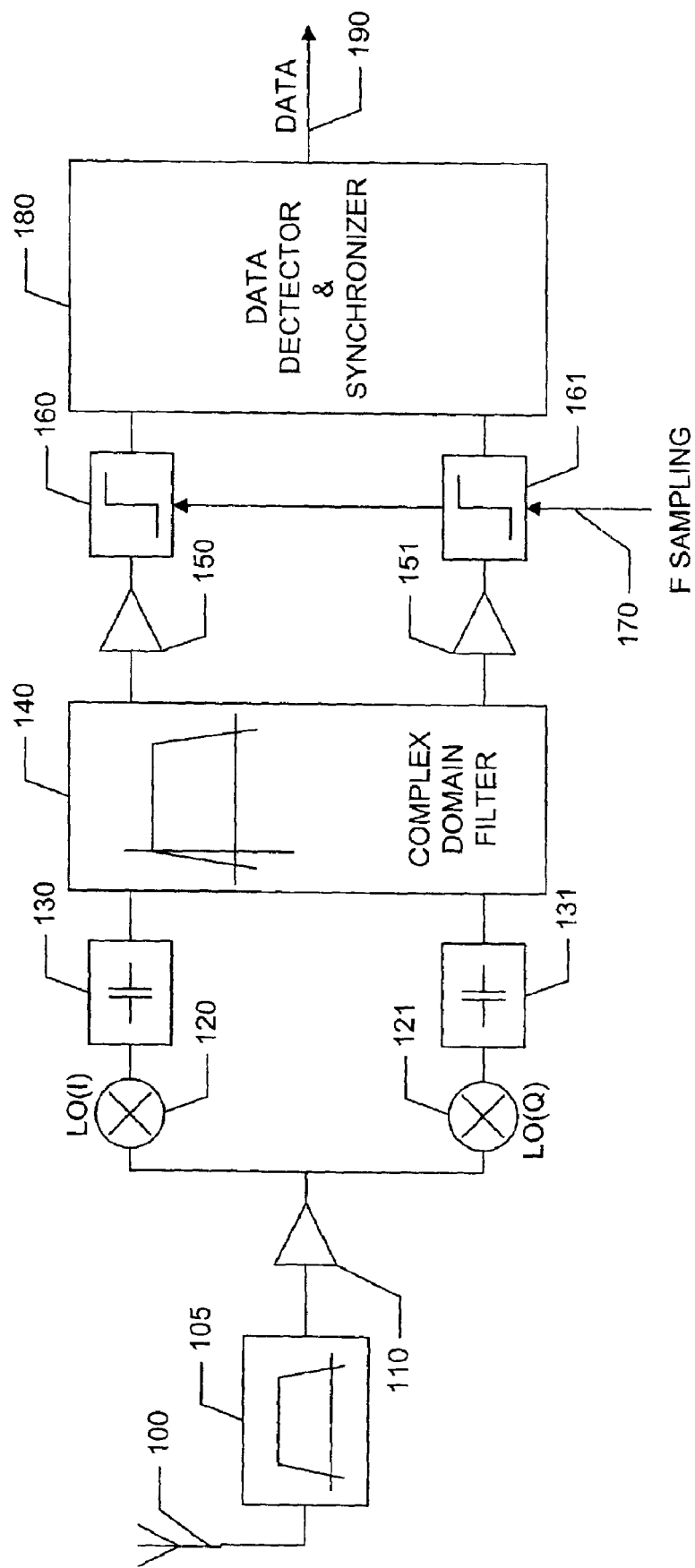
FIG. 1 is a block diagram of a radio receiver chain.

FIG. 1 shows a block diagram of a low intermediate frequency(IF) radio receiver, of which the data detection device of the present invention will be a part. The present embodiment discusses the invention with regard to a Bluetooth environment. However, one skilled in the art will recognize that the invention can be adapted for use in a plurality of different environments.

First, the antenna 100 receives a signal from another Bluetooth device. Because of the nature of the Bluetooth system, the received signal is a spread spectrum frequency hopping (SSFH) signal. This signal is fed through an input band selection filter 105. The input band selection filter 105 uses its knowledge about the incoming signal to filter out the desired signal from everything else that may be travelling in the same general frequency range.

After the unwanted signals have been filtered from the desired signal, a low noise amplifier 110 is applied to the signal. The low noise amplifier 110 amplifies the signal and only adds a relatively small amount of noise to the signal.

Next, after the low noise amplifiers 110, the signal is split and fed into separate mixing devices 120, 121, which quadrature convert the signal to a low intermediate frequency (IF) period. In this application, local oscillators (LO) 120, 121 perform the quadrature conversion of the signal. These LO mixing devices 120, 121 are generally used in super heterodyne systems for mixing an analog signal with the incoming radio frequency signal before the data is removed from the signal. The quadrature conversion results in an in-phase component of the signal and a quadrature phase component of the signal. The in-phase component is regarded as the real portion of the signal, whereas the quadrature component is regarded as the portion of the signal lying along the imaginary axis.

Next, the separate signals (in-phase and quadrature phase) are separately fed into an AC coupling devices 130, 131, such as capacitors, where the DC component of the signal is removed. The signals then each go through a complex domain (poly-phase) channel selection filter 140. The filter 140 in this example consist of five stages, but in alternative embodiments can be any number of stages, each implementing a complex pole followed by a gain. The overall transfer function of the filter 140 follows approximately the Butterworth or bandpass filter characteristic with a bandwidth of about 1 MHz, in this example, but could be numerous other types of filters, depending on the implementation. The IF frequency on the front end is chosen according to the needs of the complex domain filter 140. There is a balancing performed between 1/flickernoise (1/f noise) and the filter requirements. Higher frequencies lower the 1/f noise, but increase the complexity and power consumption of the complex domain filter 140. Here, for example, the IF frequency was chosen to be 2 MHz, which is high enough to avoid most of the adverse effects of 1/f noise, while low enough so that the required Q-factors in the filter are still practical. However, one skilled in the art should recognize that the choice of IF frequency is ultimately a matter of preference depending on the user and on the application.

The filtered signals are then amplified by amplifiers 150, 151, and sampled and limited by hard limiters 160, 161 prior to the signals entering the data detector 180. In some of the drawings, these three functions have been combined into a single block shown as a square wave with a sampling frequency applied. In the present drawing, the sampling and limiting functions have been combined into blocks 160 and 161. The limiting elements 160, 161 basically square-off the signals. In other words, the highest and lowest amplitudes of the signal are clipped, such that the signal appears to be a square wave. In Bluetooth, the signal is a Gaussian frequency shift keyed (GFSK) signal, GFSK is a known form of digital frequency modulation. This particular form of frequency modulation shifts the transmitted frequency up a nominal amount to represent a "1" and shifts down a nominal amount to represent a "0." Because the signal is frequency modulated, the amplitude of the signal can be cut without harming or altering the data carried by the waveform.

Finally, both signal components are directed into the data detector 180. Data detectors 180 exist in many forms, and differential detection in particular has been used in many contexts. Binary differential detection of frequency modulated signals have been used in the past, but most of those receivers apply a super heterodyne front end that translates a signal down to a relatively high intermediate frequency, which makes the full integration of the image-reject and channel selection filters impractical. Low IF architectures, however, enable low cost, full integration while avoiding direct conversion problems, such as, for example, DC offset and 1/f noise. However, because of the low IF frequency, differential detection of binary frequency modulation is difficult. However, the present embodiment produces a differential detection structure that is suitable for application in low IF environments, and is fully integrated, leading to a cost effective solution for the GFSK receiver.

Differential detection in the traditional sense works by multiplying a signal with a delayed version of itself. The signal is generally delayed by a $\pi/2$ phase shift and a time delay of one period. However, the differential detector poses several problems in a low IF structure with limiting amplifiers. First, creating a phase shift of $\pi/2$ over the whole band width is problematic at low frequencies. Generally a $\pi/2$ phase shift is achieved by adding a delay of 90° to a signal to achieve a $\pi/2$ phase shift at that frequency. The problem is that at low frequencies when a 90° delay is applied, the band over which that delay corresponds to a $\pi/2$ shift is very small. In practice, an expensive poly-phase filter with many poles is typically used in order to achieve a $\pi/2$ phase shift across a band of frequencies. The second problem is that double frequency terms appear in differential receivers at low frequencies, and they cannot adequately be removed, causing a degradation of the detector performance. The final problem is that limiting the signal will produce harmonics that are located very close together, causing interference.

To solve these problems, the data detector 180 of the present invention first eliminates the $\pi/2$ phase shift. Because both in-phase and quadrature phase components were available in the received signal, the $\pi/2$ phase shift is unnecessary. The quadrature phase component of the signal is a 90° shift of the in-phase signal, and thus the quadrature phase component will suffice as the $\pi/2$ shifted portion of the signal. Further, although a finite impulse response filter (FIR) is generally used to remove unwanted harmonics from a signal before performing the differential detection, in accordance with the present invention, it was discovered that the problematic terms can be handled by referring to the mathematics involved in producing the signal:

$$I(t) = A \sum_n \frac{\cos\{(2n+1)[2\pi f_c t + \phi(t)]\}}{2n+1}$$

$$Q(t) = A \sum_n \frac{\sin\{(2n+1)[2\pi f_c t + \phi(t)]\}}{2n+1}$$

$$I_d(t) = A \sum_n \frac{\cos\{(2n+1)[2\pi f_c t + \phi(t-T)]\}}{2n+1}$$

$$Q_d(t) = A \sum_n \frac{\sin\{(2n+1)[2\pi f_c t + \phi(t-T)]\}}{2n+1}$$

wherein the $I_d(t)$ and $Q_d(t)$ terms are the delayed signals, being delayed by one period, T, and the information transmitted is contained within the phase term (t). After multiplying the in-phase signal by the delayed quadrature phase signal and the delayed in phase signal by the quadrature phase signal, the results are summed, and the decision variable can be expressed as:

$$D(t) = I(t)Q_d(t) - Q(t)I_d(t)$$

which expands to:

$$D(t) = A^2 \sum_n \frac{\sin\{(2n+1)[\phi(t) - \phi(t-T)]\}}{2n+1}$$

The final signal also includes some odd order cross-frequency terms and some signal noise. More importantly, one should appreciate that the even order cross frequency terms have canceled out. Finally, it should be pointed out that the summation term yields the equivalent of a Fourier series of a triangular wave, and as such, the detector has an S-curve with a linear characteristic. This type of curve is particularly appealing in the data detection application because of the ease with which the decision can be made on such a curve.

Figure 2:
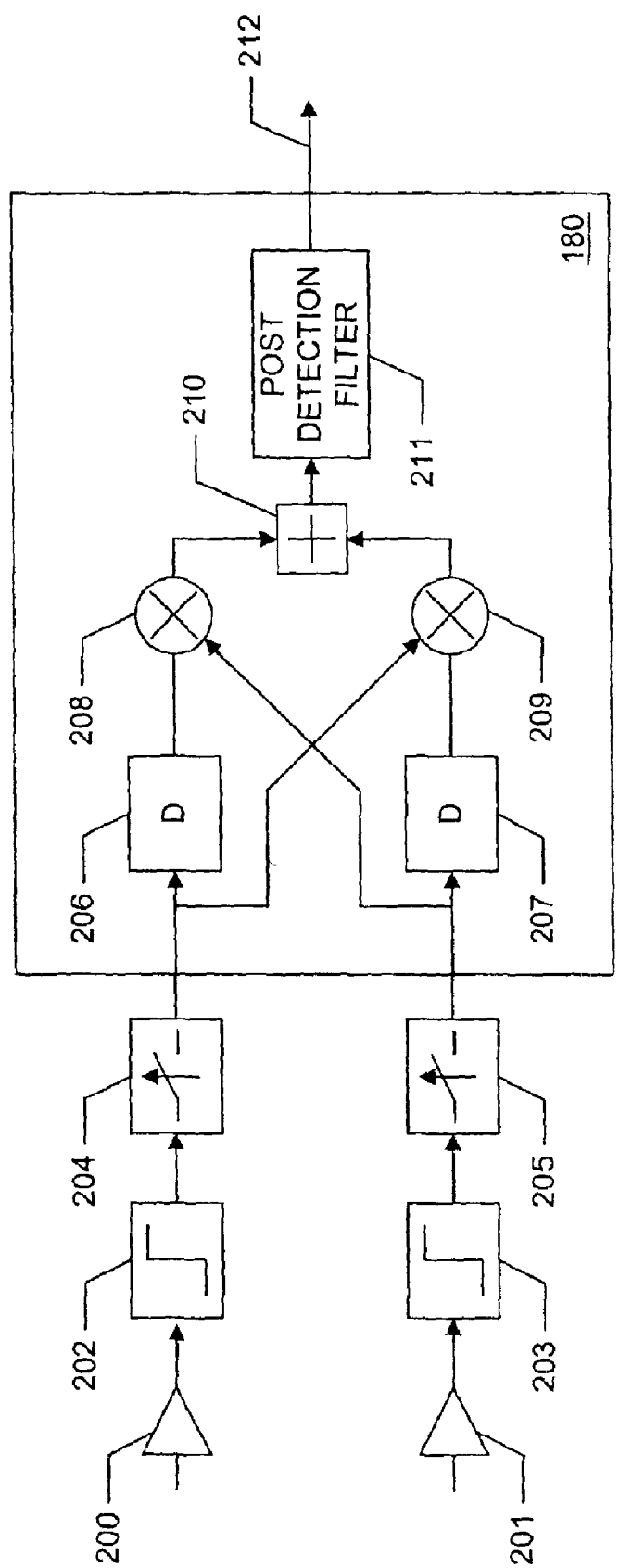
FIG. 2 is a schematic diagram of one embodiment of a differential data detector of ace the present invention comprised by the radio receiver chain shown in FIG. 1.

Referring now to FIG. 2, it can be seen that the incoming in-phase and quadrature phase signals pass through respective amplifiers 200, 201, and then through respective limiters 202, 203 where they are then limited and then sampled by samplers 204, 205, all of which is repeated from the previous drawing for clarity. After sampling, the signal is then split, one for use for the phase shift and time delay produced by delay elements 206, 207, the other for use as the reference signal. The delays elements 206, 207 in the present embodiment are preferably implemented using shift registers 206, 207. These shift registers 206, 207 shift data in and delay it one clock cycle. Alternatively, D flip-flops could be used for this purpose, or one could even use a processor such as a DSP that delays the signal.

The sampling rates on these delay elements 206, 207 are an important factor in the operation of the data detector 180. A high sampling rate would necessitate high speed requirements, thereby increasing power consumption at the detector input stage. Too low of a sampling rate would cause alias effects, which becomes important when considered in conjunction with the limiting operation, which causes harmonic byproducts. In the present example embodiment, a sampling rate of about 50 million samples per second (MSPS) was chosen. However, the exact sampling rate selected depends on the specific operating environment.

The outputs of the delay elements 206, 207 are then sent to multipliers 208, 209 where they are cross multiplied. The cross multiplication performed by multiplication elements 208, 209 entails multiplying the delayed quadrature phase signal by the in-phase signal, and the delayed in-phase signal by the quadrature phase signal. The results of the cross multiplication 208, 209 are then fed into an summing element 210, to produce the decision signal. The sum of the multiplication results is then sent through a post detection filter 211, which removes the remaining IF frequency aliasing terms.

Figure 3:
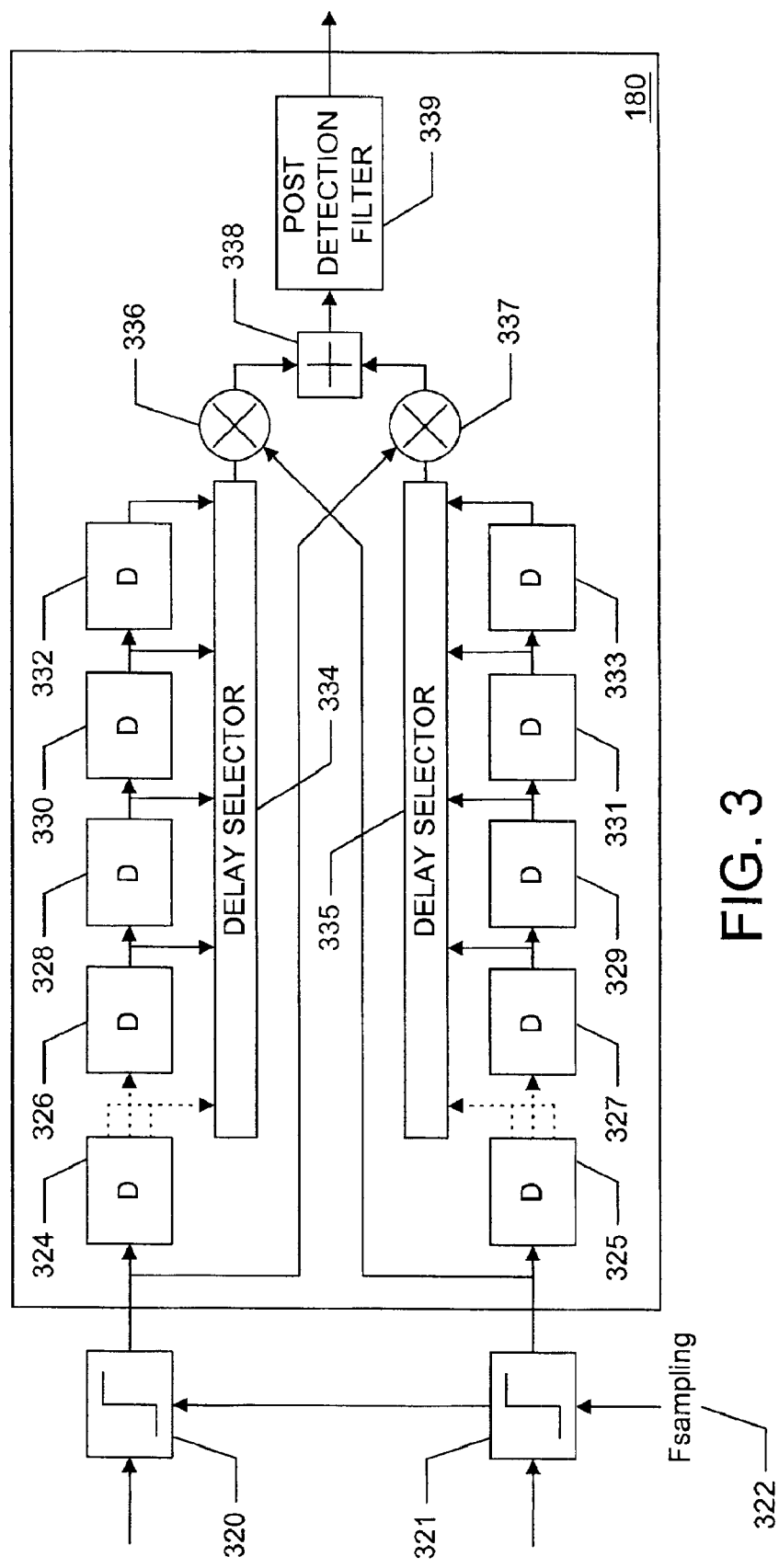
FIG. 3 is a schematic diagram of an alternative embodiment of a differential data detector of the present invention that may be incorporated into the radio receiver chain of FIG. 1.

An alternative embodiment of the present invention is illustrated in FIG. 3. Here, the input stage amplifying, limiting and sampling elements shown in FIG. 1 as two sets of elements are combined into a single set of elements 320, 321, with a sampling frequency of "Fsampling" 322. However, this change is non-substantive. One skilled in the art would appreciate that the substantive change in this embodiment is that it uses multiple delay elements 324–333. These multiple delay elements 324–333 are used so that the data detector can adjust the delay period. Adjusting the delay period, helps the receiver in receiving a transmission that has been subjected to something that has caused variance in the frequency offset, such as the operating environment, transfer clock irregularities, etc. Delay selectors 334, 335 choose which signal will be fed into the multiplication elements 336, 337, to be multiplied by its counterpart undelayed signal. After multiplication, the signal is summed in summer 338, and fed through a post detection filter 339.

In one embodiment, for example, among others, the adjustable delay can be implemented in two stages. In this situation, the data detector 180 would adjust the delay during the preamble, which is received at the beginning of every packet transmission. The first stage could be a rough compensation adjustment where the decision variable would be tested to see whether it hits a lower or higher threshold a certain number of times. When the threshold is hit a certain number of times, the delay is adjusted to re-center the decision variable. The last stage could be a fine compensation at the end of the preamble, for one example, among others. Here the DC offset would be measured and then used to give the decision variable a proper offset. However, it should be understood by one skilled in the art that there are other frequency offset compensation algorithms that can be substituted for the example of the frequency offset compensation outlined above, which uses an adjustable delay to provide the offset compensation.

Figure 4:
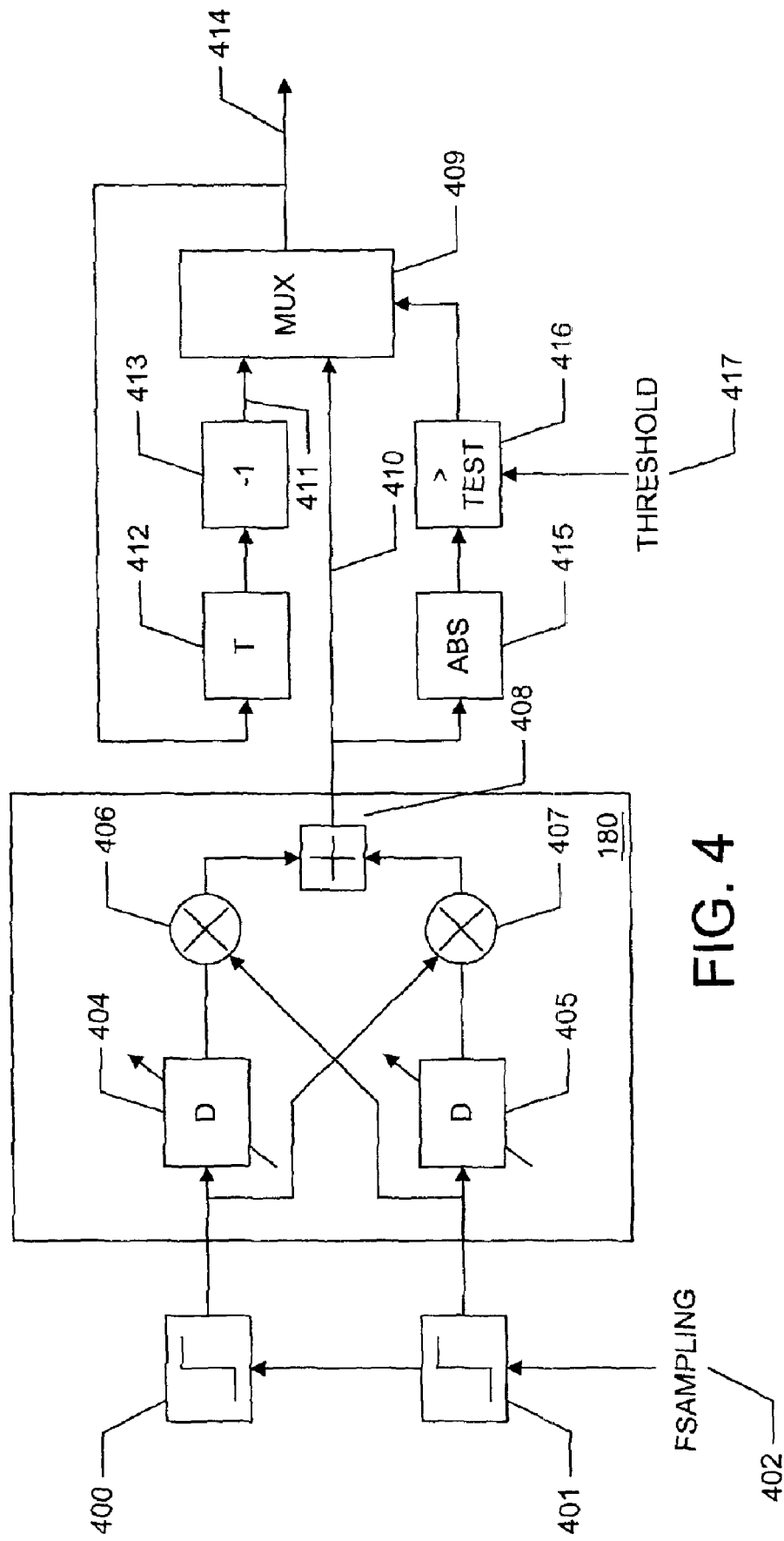
FIG. 4 is a schematic diagram of the data detector including logic for performing a post detection correction algorithm.

Used in conjunction with the differential data detector embodiments described above, a post data correction algorithm as shown in FIG. 4 can be employed after the data detector 180 to provide several decibels of improvement in the sensitivity of the receiver. Inter-symbol interference, which is inherently present in the GFSK modulation technique, is the cause of most of the errors seen in systems that employ this modulation technique. In addition to the Gaussian filter, the complex-domain channel selection filter contributes to inter-symbol interference. This interference is most disruptive in alternating bit patterns such as 1-0-1-0. In order to minimize the inter-symbol interference, in accordance with the present invention, a simplified implementation of an equalizer is used to reduce the effects of inter-symbol interference.

Referring now to FIG. 4, shown is the differential detector of FIG. 3 used in conjunction with a post detection correction algorithm. In the example implementation of the post detection correction algorithm shown here, a two-input multiplexer 409 is used. The first input is simply the decision signal 410 from the data detector 180. The second input is a feedback signal 411. The feedback signal is delayed by delay element 412 and inverted by inverter 413, such that the feedback signal is an inversion of the previous output of multiplexer 409. The first input to multiplexer 409 is selected and output when the absolute value 415 of the decision variable exceeds a certain threshold value 416. The absolute value 415 of the decision variable is then tested by test element 416. If the absolute value 415 does not exceed a threshold value 417 fed into the test element 416, the previous signal 412 inverted by inverter 413 is selected and output as output signal 414.

In other words, when the decision variable is not clearly indicating one level or another, the level opposite of the previous level is chosen. If a strong high output is indicated, then as long as it remains a strong high, the output of the multiplexer remains high. If the strength of the signal dips below a threshold, then the algorithm assumes that a transition was intended, and switches to output a low signal, the opposite of the previous output. If the signal remains weak, the algorithm again assumes a transition was intended and switches back to a high output. Otherwise, if the signal becomes a strong low, above the threshold strength, then the output signal will remain low until the signal becomes a weak low, at which time the algorithm will transition to a high output.

The invention outlined herein can be implemented in hardware, software, or any combination thereof, but it should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing from the scope of the invention. All a such modifications and variations are intended to be included herein within the scope of this disclosure and the present invention.

What is claimed is:

1. A data detector, comprising:
   a delay logic, receiving an unfiltered input signal in quadrature and in-phase components, and applying a delay to each of the in-phase and quadrature phase components of the unfiltered input signal;
   a first multiplication logic, the first multiplication logic multiplying the delayed in-phase component of the unfiltered input signal by the quadrature phase component of the unfiltered input signal to obtain a first multiplication result;
   a second multiplication logic, the second multiplication logic multiplying the delayed quadrature phase component of the unfiltered input signal by the in-phase component of the unfiltered input signal to obtain a second multiplication result;
   an adder, the adder adding the first multiplication result with the second multiplication result and generating a decision signal; and
   a post-detection correction logic, the post-detection correction logic being applied to the decision signal to reduce inter-symbol interference.

2. The data detector as defined in claim 1, wherein the delay logic comprises at least one shift register.

3. The data detector as defined in claim 2, wherein the delay applied by the delay logic is approximately equal to a symbol period.

4. The data detector as defined in claim 3, wherein the delay logic has a sampling rate of about 50 million samples per second.

5. The data detector as defined in claim 2, wherein the delay period of the delay logic is adjustable, allowing for frequency offset compensation.

6. The data detector as defined in claim 5, wherein the delay logic comprises a multi-stage delay.

7. The data detector as defined in claim 1, wherein the post-detection correction logic comprises:
   a test logic, the test logic receiving the decision signal and asserting a selection signal when the absolute value of the decision signal exceeds a threshold; and
   a multiplexer, receiving the selection signal, the decision signal and an inversion of a previously corrected signal, the selection signal being used to decide whether to output the decision signal or the inversion of a previously corrected signal, and producing a post-detection corrected signal.

8. A data detector, comprising:
   a delay logic, receiving an input signal in quadrature and in-phase components, and applying a delay to each of the in-phase and quadrature phase components of the input signal, wherein the delay is adjustable, allowing for frequency offset compensation;
   a first multiplication logic, the first multiplication logic multiplying the delayed in-phase component of the input signal by the quadrature phase component of the input signal to obtain a first multiplication result;
   a second multiplication logic, the second multiplication logic multiplying the delayed quadrature phase component of the input signal being by the in-phase component of the input signal to obtain a second multiplication result; and
   an adder, the adder adding the first multiplication result with the second multiplication result generating a decision signal.

9. The data detector as defined in claim 8, wherein the delay logic comprises at least one shift register, and the delay applied by the logic is approximately equal to a symbol period.

10. The data detector as defined in claim 9, wherein the delay logic has a sampling rate of about 50 million samples per second.

11. The data detector as defined in claim 9, wherein the delay logic comprises a multi-stage delay.

12. The data detector as defined in claim 8, wherein the data detector further comprises a post-detection correction logic, the post-detection correction logic being applied to the decision signal and reducing the inter-symbol interference.

13. The data detector as defined in claim 12, wherein the post-detection correction comprises:
   a test logic, the test logic receiving the decision signal and asserting a selection signal when the absolute value of the decision signal exceeds a threshold; and
   a multiplexer, receiving the selection signal, the decision signal and an inversion of a previously corrected signal, the selection signal being used to decide whether to output the decision signal or the inversion of a previously corrected signal, and producing a post-detection corrected signal.

14. A method for detecting data, the method comprising the steps of:
   receiving an unfiltered input signal having an in-phase component and a quadrature phase component;
   delaying the in-phase and quadrature phase components of the input signal;
   multiplying the in-phase component of the input signal by the delayed quadrature phase component of the input signal to yield a first result;
   multiplying the delayed in-phase component of the input signal by the quadrature phase component of the input signal to yield a second result;
   summing the first and second results to obtain a decision signal;
   testing to find whether the absolute value of th decision variable exceeds a threshold;
   sending the result of the test to the selection input of a multiplexer; and
   outputting the decision variable from the multiplexer if it exceeds a certain threshold, otherwise choosing an inversion of the previous multiplexer output.

15. The method as defined in claim 14, wherein delaying of the in-phase and quadrature phase signals is approximately equal to a symbol period.

16. The method as defined in claim 15, wherein the delay is realized using shift registers which sample at the rate of about 50 million samples per second.

17. The method as defined in claim 14, wherein the method further comprises adjusting the delay, to allow for frequency offset compensation.

18. The method as defined in claim 17, wherein the adjustment occurs during a transmission preamble, and comprises a two stage adjustment, the first being a rough compensation at the beginning of the preamble and the second being a fine compensation at the end of the preamble.

19. A method for detecting data, the method comprising the steps of:
   receiving an input signal having an in-phase component and a quadrature phase component;
   delaying the in-phase and quadrature phase components of the input signal;
   multiplying the in-phase component of the input signal by the delayed quadrature phase component of the input signal to yield a first result;

multiplying the delayed in-phase component of the input signal by the quadrature phase component of the input signal to yield a second result;

summing the first and second results to obtain a decision signal; and compensating for a frequency offset.

20. The method as defined in claim 19, wherein the method further comprises a post-detection correction method comprising the steps of:

testing to find whether the absolute value of the decision variable exceeds a threshold;

sending the result of the test to the selection input if a multiplexer; and outputting the decision variable from the multiplexer if it exceeds a certain threshold, otherwise choosing an inversion of the previous multiplexer output.

21. The method as defined in claim 19, wherein the delay of the in-phase and quadrature phase components is approximately equal to a symbol period.

22. The method as defined in claim 21, wherein the delay is realized using shift registers which sample at the rate of about 50 million samples per second.

23. The method as defined in claim 19, wherein the frequency offset compensation comprises adjusting the delay.

24. The method as defined in claim 23, wherein the adjustment occurs during a transmission preamble, and comprises a two stage adjustment, the first being a rough compensation at the beginning of the preamble and the second being a fine compensation at the end of the preamble.

25. A data detection system comprising:

means for receiving an unfiltered input signal comprising an in-phase component and a quadrature phase component;

means for delaying the in-phase and quadrature phase components;

means for first multiplication, multiplying the in-phase component by the delayed quadrature phase component;

means for second multiplication, multiplying the delayed in-phase component by the quadrature phase component;

means for summing the result of the first multiplication with the result of the second multiplication to receive a decision variable; and post detection correction means.

26. The system as defined in claim 25, wherein the post detection correction means comprises:

means for testing whether the absolute value of the decision variable exceeds a threshold; and means for outputting either the decision variable or an inversion of the previous output, depending on the result of the testing means.

27. The data detector as defined in claim 25, wherein the delay means delay the signal by approximately one symbol period.

28. The data detector as defined in claim 27, wherein the delay means are shift registers which sample at a rate of about 50 million samples per second.

29. The data detector as defined in claim 25, wherein the data detection further comprises a means for compensating for frequency offset.

30. The data detector as defined in claim 29, wherein the frequency offset compensation means comprises making the delay means adjustable.

31. The data detector as defined in claim 30, wherein the adjustable delay means comprises both a rough compensation at the beginning of a preamble transmission and a fine compensation at the end of the preamble transmission.

32. A radio receiver chain, comprising:

an antenna capable of receiving a radio signal;

an input band selection filter coupled to the antenna;

a low noise amplifier, coupled to the output of the input band selection filter;

a first mixer for deriving an in-phase signal, coupled to the output of the low noise amplifier;

a second mixer for deriving a quadrature phase signal, coupled to the output of the low noise amplifier;

a channel selection filter, coupled to the in-phase and quadrature phase signals;

a first limiting amplifier, coupled to the in-phase output of the channel selection filter and capable of sampling the in-phase signal;

a second limiting amplifier, coupled to the quadrature phase output of the channel selection filter and capable of sampling the quadrature phase signal;

a data detector comprising:

an in-phase and a quadrature phase signal, without any finite impulse response filtering;

a first delay element, delaying the in-phase signal;

a second delay element, delaying the quadrature phase signal;

a first multiplier, multiplying the in-phase signal by the delayed quadrature phase signal;

a second multiplier, multiplying the quadrature phase signal by the delayed in-phase signal; and an adder, summing the results of the first and second multipliers to derive a decision signal.

33. The radio receiver chain as defined in claim 32, wherein the chain further comprises a post detection filter receiving the decision variable and removing the odd order cross components.

34. The radio receiver chain as defined in claim 33, wherein the chain further comprises a post detection correction algorithm, comprising a multiplexer having two inputs and a selection signal, the first input comprising the output of the post detection filter, the second input comprising a delayed inversion of the previous multiplexer output, and the selection signal comprising a test result, wherein the test is whether the absolute value of the output of the post detection filter is greater than a threshold value.

35. The radio receiver chain as defined in claim 32, wherein the delay is chosen such that it is approximately one symbol period.

36. The radio receiver chain as defined in claim 32, wherein the delay is comprised of a plurality of shift registers, and the chain further comprises a delay selection to adjust the delay according to which delay fits the incoming frequency to most effectively detect the data.

* * * * *